US007874661B2

(12) United States Patent
Tidrick

(10) Patent No.: US 7,874,661 B2

(45) Date of Patent: Jan. 25, 2011

(54) SOLID INK STICK WITH CODED MARKINGS AND METHOD AND APPARATUS FOR READING MARKINGS

(75) Inventor: Robert Carl Tidrick, Tigard, OR (US)

(73) Assignee: Xerox Corporation, Norwalk, CT (US)

( * ) Notice: Subject to any disclaimer, the term of this patent is extended or adjusted under 35 U.S.C. 154(b) by 822 days.

(21) Appl. No.: 11/472,977

(22) Filed: Jun. 22, 2006

(65) Prior Publication Data

US 2007/0296779 A1 Dec. 27, 2007

(51) Int. Cl.
*B41J 2/175* (2006.01)
*B41J 29/38* (2006.01)
*G01D 11/00* (2006.01)

(52) U.S. Cl. ................................ 347/88; 347/99; 347/5

(58) Field of Classification Search ................... 347/88, 347/19, 99, 84, 85, 95, 5, 14, 7
See application file for complete search history.

(56) References Cited

U.S. PATENT DOCUMENTS 5,223,860 A 6/1993 Loofbourow et al.
5,442,387 A 8/1995 Loofbourow et al.
5,867,586 A * 2/1999 Liang ......................... 382/112
5,975,688 A * 11/1999 Kanaya et al. ................ 347/86
5,995,772 A * 11/1999 Barry et al. ................... 399/12
6,213,600 B1 * 4/2001 Kobayashi et al. ............ 347/86
6,353,479 B1 3/2002 Lubawy et al.
6,416,154 B1 * 7/2002 Silverbrook ................. 347/19
6,761,443 B2 * 7/2004 Jones .......................... 347/88
6,820,815 B2 11/2004 Meunier et al.
6,840,613 B2 1/2005 Jones
6,924,835 B1 * 8/2005 Silverbrook et al. ... 348/207.99
6,948,661 B2 9/2005 Silverbrook et al.
7,163,273 B2 * 1/2007 Silverbrook ................. 347/19
7,537,326 B2 * 5/2009 Jones .......................... 347/88
7,682,010 B2 * 3/2010 Lucas et al. ................... 347/99
2005/0231584 A1 * 10/2005 Rajaiah et al. .............. 347/232
2006/0252088 A1 * 11/2006 Dejneka et al. ................ 435/6
2007/0156628 A1 * 7/2007 Rodriguez et al. ............. 707/1

OTHER PUBLICATIONS

Office Action mailed May 13, 2009, U.S. PTO, Alexandria, VA, U.S. Appl. No. 11/546,064.

* cited by examiner

*Primary Examiner*—Stephen D Meier
*Assistant Examiner*—Leonard S Liang
(74) *Attorney, Agent, or Firm*—Maginot, Moore & Beck LLP

(57) ABSTRACT

An ink stick for use in a phase change ink imaging device is provided. The ink stick comprises a three dimensional ink stick body having an exterior surface. The ink stick includes one or more coded markers formed in the exterior surface from a leading end to a trailing end of the ink stick body parallel to a feed direction of the ink loader, each coded marker including a coded pattern of indicia for being optically read as the coded marker passes a sensor in the feed channel. The coded pattern of indicia may include areas of varying widths and/or varying reflective properties for generating a coded signal pattern indicating variable control/attribute information to a control system of an imaging device.

12 Claims, 9 Drawing Sheets

SOLID INK STICK WITH CODED MARKINGS AND METHOD AND APPARATUS FOR READING MARKINGS

CROSS-REFERENCE TO RELATED APPLICATIONS

Reference is made to commonly-assigned copending U.S. patent application Ser. No. 11/473,632, filed concurrently herewith, entitled "Solid Ink Stick With Interface Element", the disclosures of which are incorporated herein.

TECHNICAL FIELD

This disclosure relates generally to phase change ink jet printers, the solid ink sticks used in such ink jet printers, and the load and feed apparatus for feeding the solid ink sticks within such ink jet printers.

BACKGROUND

Solid ink or phase change ink printers conventionally use ink in a solid form, either as pellets or as ink sticks of colored cyan, yellow, magenta and black ink fed into shape coded openings. These openings fed generally vertically into the heater assembly of the printer where they were melted into a liquid state for jetting onto the receiving medium. The pellets were fed generally vertically downwardly, using gravity feed, into the ink loader. These pellets were elongated with separate multisided shapes each corresponding to a particular color.

Solid ink sticks have been typically either gravity fed or spring loaded into a feed channel and pressed against a heater plate to melt the solid ink into its liquid form. These ink sticks were shape coded and of a generally small size. One system used an ink stick loading system that initially fed the ink sticks into a preload chamber and then loaded the sticks into a load chamber by the action of a transfer lever. Earlier solid or hot melt ink systems used either a flexible web of hot melt ink that was incrementally unwound and advanced to a heater location or particulate hot melt ink that was delivered by vibrating the particulate into the melt chamber.

In previously known phase change ink jet printing systems, the interface between a control system for a phase change ink jet printer and a solid ink stick provided little information about the solid ink sticks loaded in the printer. For instance, control systems are not able to determine if the correct color of ink stick is loaded in a particular feed channel or if the ink that is loaded is compatible with that particular printer. Provisions have been made to ensure that an ink stick is correctly loaded into the intended feed channel and to ensure that the ink stick is compatible with that printer. These provisions, however, are generally directed toward excluding wrong colored or incompatible ink sticks from being inserted into the feed channels of the printer. For example, the correct loading of ink sticks has been accomplished by incorporating keying, alignment and orientation features into the exterior surface of an ink stick. These features are protuberances or indentations that are located in different positions on an ink stick. Corresponding keys or guide elements on the perimeters of the openings through which the ink sticks are inserted or fed exclude ink sticks which do not have the appropriate perimeter key elements while ensuring that the ink stick is properly aligned and oriented in the feed channel.

While this method is effective in ensuring correct loading of ink sticks in most situations, there are still situations when an ink stick may be incorrectly loaded into a feed channel of a printer. For example, world markets with various pricing and color table preferences have created a situation where multiple ink types may exist in the market simultaneously with nearly identical size/shape ink and/or ink packaging. Thus, ink sticks may appear to be substantially the same but, in fact, may be intended for different phase change printing systems due to factors such as, for example, market pricing or color table. In addition, due to the soft, waxy nature of an ink stick body, an ink stick may be "forced" through an opening into a feed channel. The printer control system, having no information regarding the configuration of the ink stick, may then conduct normal printing operations with an incorrectly loaded ink stick. If the loaded ink stick is the wrong color for a particular feed channel or if the ink stick is incompatible with the phase change ink jet printer in which it is being used, considerable errors and malfunctions may occur.

SUMMARY

An ink stick for use in a phase change ink imaging device is provided. The ink stick comprises a three dimensional ink stick body having an exterior surface. The ink stick includes one or more coded markers formed in the exterior surface from a leading end to a trailing end of the ink stick body parallel to a feed direction of the ink loader, each coded marker including a coded pattern of indicia for being optically read as the coded marker passes a sensor in the feed channel. The coded pattern of indicia may include areas of varying widths and/or varying reflective properties for generating a coded signal pattern indicating variable control/attribute information to a control system of an imaging device.

In another embodiment, a method of feeding ink sticks in an ink loader of a phase change imaging device is provided. The method comprises inserting an ink stick into a feed channel of a phase change imaging device, the ink stick including a coded marker formed in an exterior surface of the ink stick from a leading end to a trailing end of the ink stick parallel to a feed direction of the ink loader, the coded marker including a coded pattern of indicia. The ink stick is urged along the feed channel toward the melt end of the feed channel. A beam of light may be directed onto the coded pattern of indicia of the coded marker as the ink stick is being urged along the feed channel. A signal strength of the light reflected from the coded pattern of indicia is detected, and a signal pattern is generated that corresponds to the detected signal strength of the light reflected from the coded pattern of indicia. The signal pattern may then be decoded to determine variable control/attribute information encoded into the coded pattern of indicia.

DETAILED DESCRIPTION OF THE PREFERRED EMBODIMENT

Figure 1:
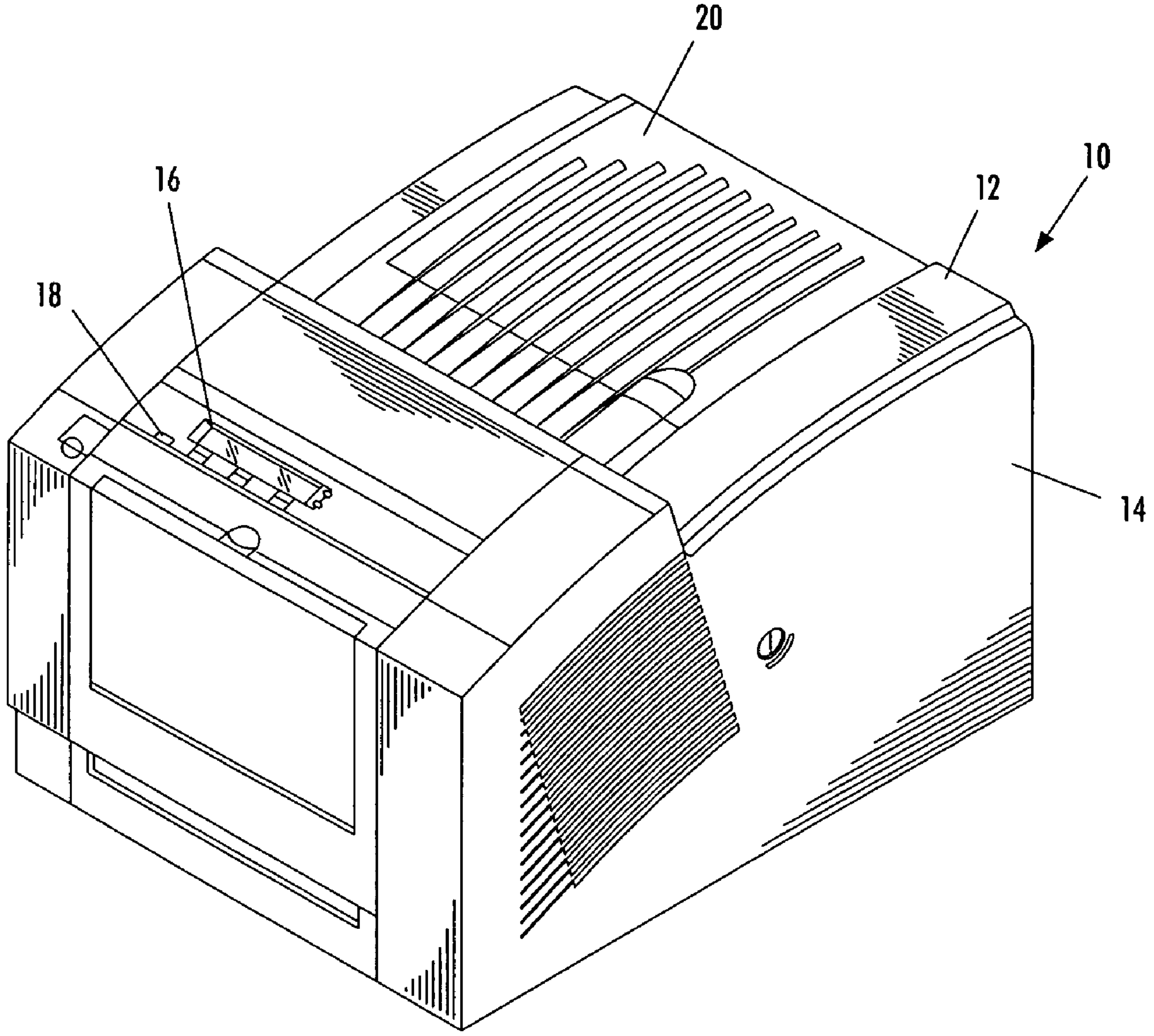
FIG. 1 is a perspective view of a phase change printer with the printer top cover closed.

For a general understanding of the present embodiments, reference is made to the drawings. In the drawings, like reference numerals have been used throughout to designate like elements.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the front panel display screen, or may be at other locations on the printer. An ink jet printing mechanism (not shown) is contained inside the housing. An example of the printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink loader 100 delivers ink to the printing mechanism. The ink loader 100 is contained under the top surface of the printer housing. The top surface of the housing includes a hinged ink access cover 20 that opens as shown in FIG. 2, to provide the operator access to the ink loader 100.

Figure 2:
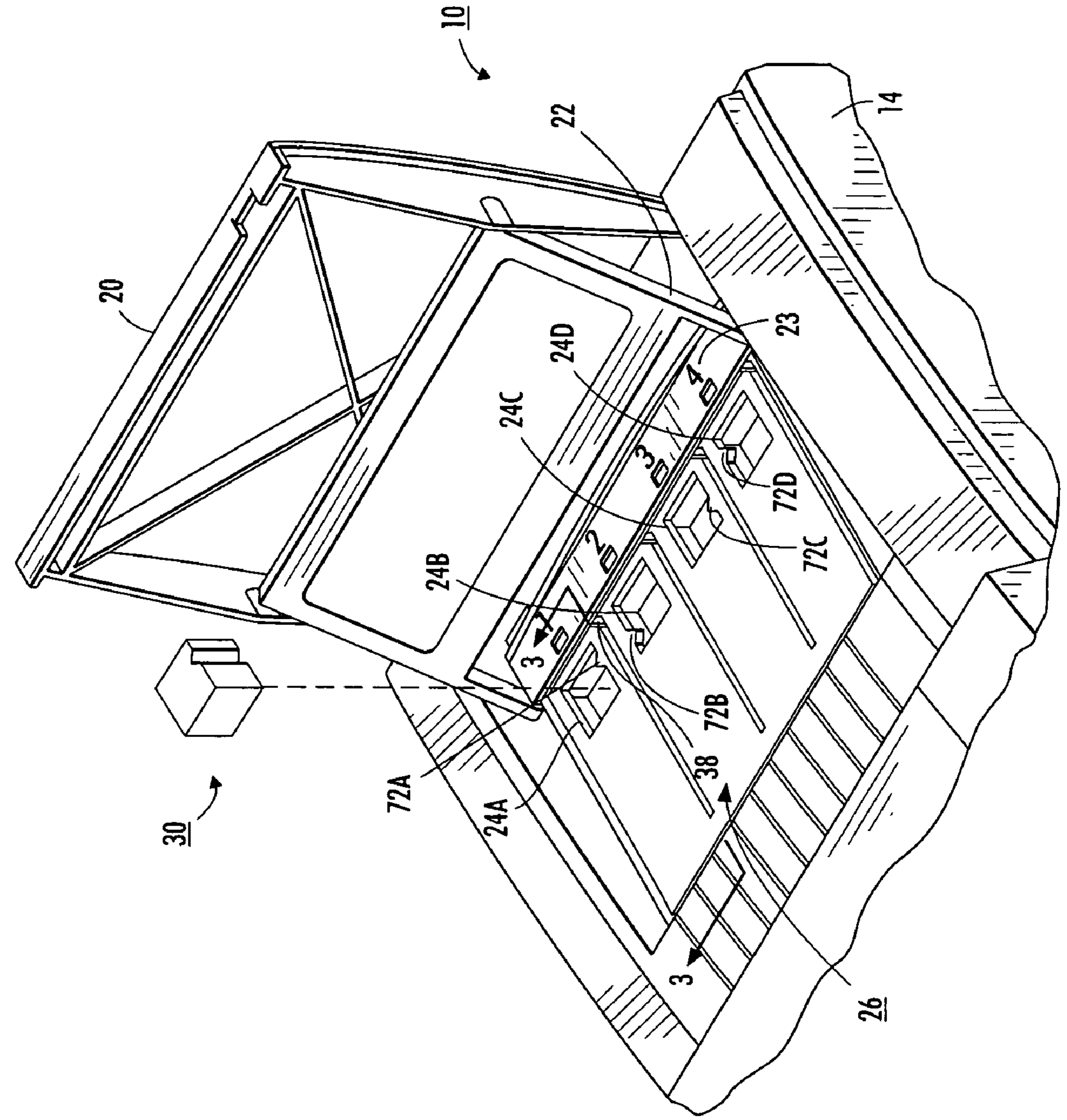
FIG. 2 is an enlarged partial top perspective view of the phase change printer with the ink access cover open, showing a solid ink stick in position to be loaded into a feed channel.
Figure 3:
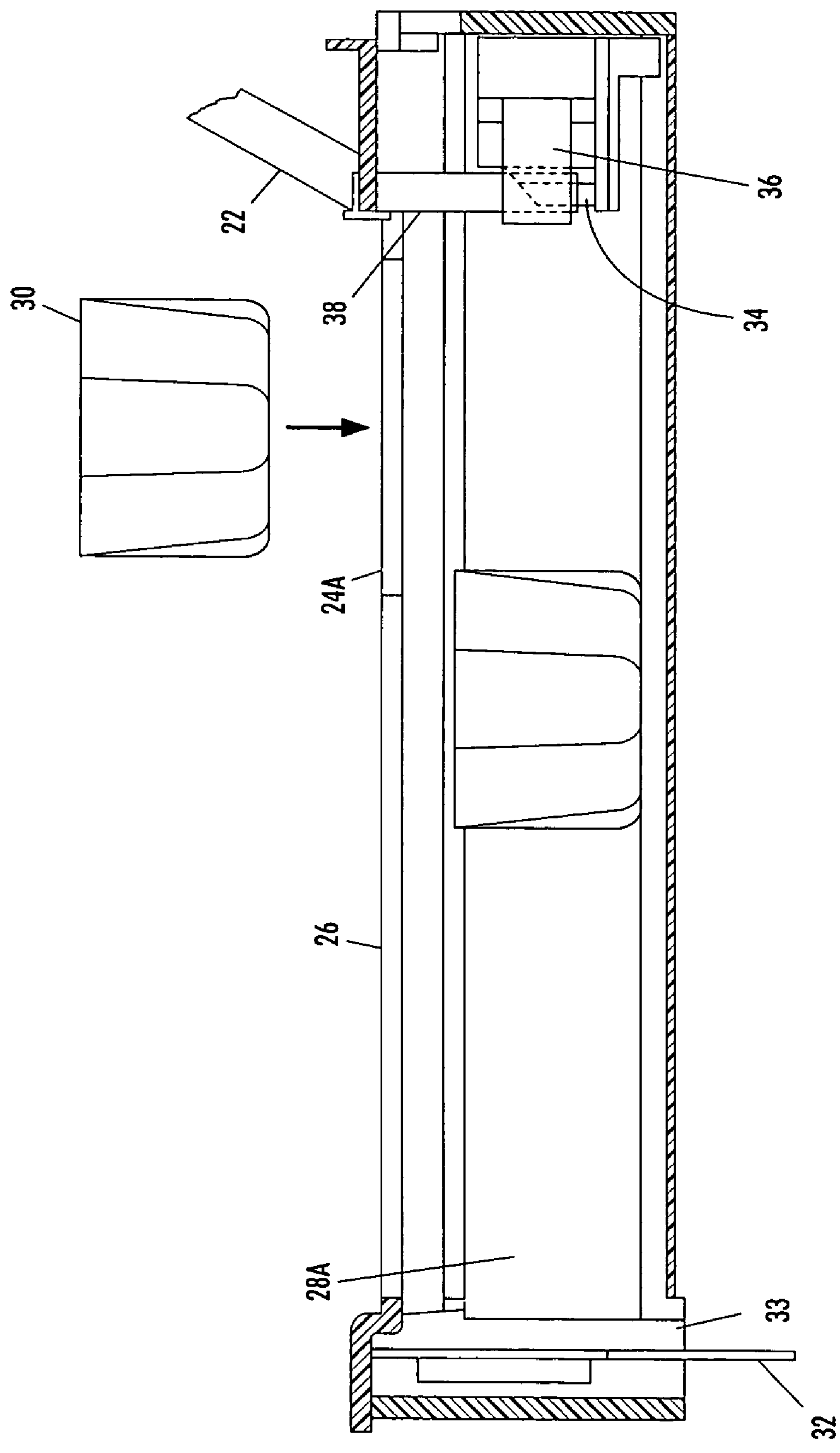
FIG. 3 is a side sectional view of a feed channel of a solid ink feed system taken along line 3-3 of FIG. 2.

FIG. 2 illustrates the printer 10 with its ink access cover 20 raised revealing an ink load linkage element 22 and an ink stick feed assembly or ink loader 100. In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al. As seen in FIG. 2, the ink loader includes a key plate 26 having keyed openings 24. Each keyed opening 24A, 24B, 24C, 24D provides access to an insertion end of one of several individual feed channels 28A, 28B, 28C, 28D of the ink loader (see FIG. 3).

Each longitudinal feed channel 28 of the ink loader 100 delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28A, 28B, 28C, 28D (see FIG. 3) have a longitudinal dimension from the insertion end to the melt end, and a lateral dimension, substantially perpendicular to the longitudinal dimension.

Each feed channel 28 in the particular embodiment illustrated includes a push block 34 driven by a driving force or element, such as a constant force spring 36 to push the individual ink sticks along the length of the longitudinal feed channel toward the melt plates 32 that are at the melt end of each feed channel. The tension of the constant force spring 36 drives the push block 34 toward the melt end of the feed channel. In a manner similar to that described in U.S. Pat. No. 5,861,903, the ink load linkage 22 is coupled to a yoke 38, which is attached to the constant force spring mounted in the push block. The attachment to the ink load linkage 22 pulls the push block 34 toward the insertion end of the feed channel when the ink access cover is raised to reveal the key plate 26. In the implementation illustrated, the constant force spring 36 can be a flat spring with its face oriented along a substantially vertical axis.

A color printer typically uses four colors of ink (yellow, cyan, magenta, and black). Ink sticks 30 of each color are delivered through a corresponding individual one of the feed channels 28A, 28B, 28C, 28D. The operator of the printer exercises care to avoid inserting ink sticks of one color into a feed channel for a different color. Ink sticks may be so saturated with color dye that it may be difficult for a printer operator to tell by the apparent color alone which color is which. Cyan, magenta, and black ink sticks in particular can be difficult to distinguish visually based on color appearance. The key plate 26 has keyed openings 24A, 24B, 24C, 24D to aid the printer operator in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 4:
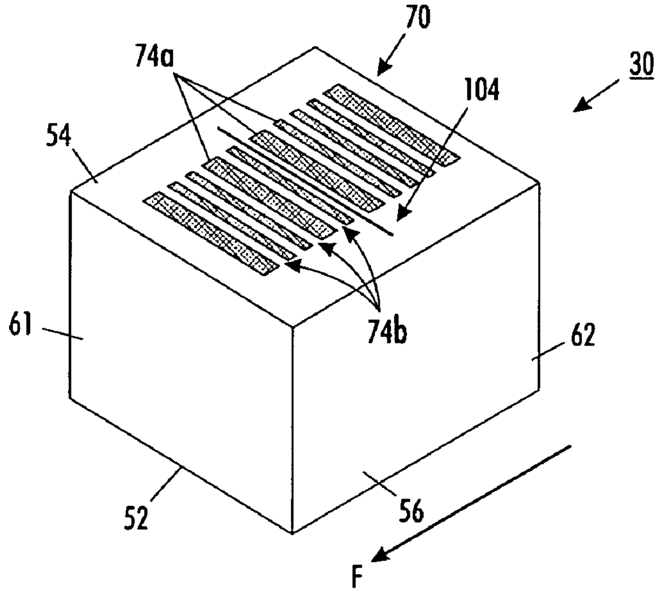
FIG. 4 is a perspective view of one embodiment of a solid ink stick with a coded marker.

An exemplary solid ink stick 30 for use in the ink loader is illustrated in FIG. 4. The ink stick is formed of a three dimensional ink stick body. The ink stick body illustrated has a bottom exemplified by a generally bottom surface 52 and a top exemplified by a generally top surface 54. The particular bottom surface 52 and top surface 54 illustrated are substantially parallel one another, although they can take on other contours and relative relationships. Moreover, the surfaces of the ink stick body need not be flat, nor need they be parallel or perpendicular one another.

The ink stick body also has a plurality of side extremities, such as side surfaces 56 and end surfaces 61, 62. The illustrated embodiment includes four side surfaces, including two end surfaces 61, 62 and two lateral, side surfaces 56. The basic elements of the lateral side surfaces 56 are substantially parallel one another, and are substantially perpendicular to the top and bottom surfaces 52, 54. The end surfaces 61, 62 are also basically substantially parallel one another, and substantially perpendicular to the top and bottom surfaces, and to the lateral side surfaces. One of the end surfaces 61 is a leading end surface, and the other end surface 62 is a trailing end surface. The ink stick body may be formed by pour molding, injection molding, compression molding, or other known techniques.

Referring again to FIG. 4, the ink stick may include one or more coded markers 70 for encoding variable control information or attribute information into the ink stick 30. Each coded marker 70 may be configured to interface with a sensor system in a feed channel of an ink loader to generate a coded signal pattern that corresponds to the variable control and/or attribute information. The coded signal pattern may take any form that is suitable to convey information to an imaging device control system such as, for example, a waveform, pulse-width modulated signal, etc. Each coded marker 70 includes a coded pattern of indicia 74 for generating the coded signal pattern. In one embodiment, coded marker 70 comprises a generally linear array of indicia that forms a path substantially parallel to the feed direction that may be read as the ink stick is urged along a feed channel by the push block or by gravity. The pattern of indicia of a coded marker, however, may have any suitable arrangement, pattern, or the like, including arrays perpendicular to the feed direction, concentric rings, etc.

A coded marker 70 may be located in a predetermined position corresponding to a sensor location in a feed channel. In the embodiment of FIG. 4, shown on the top surface 54 of the ink stick 30 although coded markers may be formed on any surface or more than one surface of the ink stick depending on sensor placement. The number and positioning of coded markers that may be placed on an ink stick is limited only by the geometry of the ink sticks and sensor placement options in an ink loader. A coded marker may be beneficially placed in a location on the exterior surface of an ink stick where handling damage cannot easily influence sensor interface with the ink loader such as, for example, a recess or inset portion in the exterior surface of the ink stick.

In one embodiment, information may be encoded into a coded marker 70 by selecting a unique identifier, or code word, to be indicated by a coded marker 70 and implementing an encoding scheme in the coded marker such that coded pattern of signals generated corresponds to the code word. A code word may comprise one or more values, alphanumeric characters, symbols, etc. that may be associated with a meaning by an imaging device control system. The code word may be assigned to indicate control and/or attribute information that pertains to an ink stick. The code word may be read by an imaging device control system and translated into the control and/or attribute information pertaining to the ink stick that may be used in a number of ways by the control system. The control system may use the code word as a lookup key for accessing data stored in a data structure, such as, for example, a database or table. The data stored in the data structure may comprise a plurality of possible code words with associated information corresponding to each code word.

The coded signal pattern indicating a code word may correspond to an optical characteristic of the coded pattern of indicia 74. For instance, the coded signal pattern generated may correspond to the reflectivity of the coded pattern of indicia. In this embodiment, the coded marker includes a plurality of areas 74*a* treated to modify the reflectance characteristics of the areas relative to the untreated areas 74*b* of the ink stick 30. The coded marker 70 of the ink stick of FIG. 4 shows a plurality of textured areas 74*a* of varying widths although non-textured areas may have varying widths as well. The texture of the areas 74*a* may be any texture that may cause a light beam to be scattered in a manner sufficient to cause the beam to be detected at a different signal level than the untreated or non-textured areas 74*b* of the ink stick 30. The textured areas 74*a* may be formed by high-pressure injection molding. Thus, the textured areas may be incorporated into an ink stick during initial manufacturing of an ink stick. Alternatively, the textured areas 74*a* may be formed by subsequent treatment of the ink stick such as by stamping or embossing. Treating the surface of an ink stick to form a coded marker 70 eliminates handling issues that may be caused by tagging the ink with foreign material. Foreign tagging material on an ink stick may interfere with the melting process, block print jets, contaminate the ink, etc.

Thus, in one embodiment, the coded marker 70 of the ink stick of FIG. 4 may be read by serially illuminating the textured 74*a* and non-textured areas 74*b* of the coded marker 70 and detecting the signal strength of the light reflected from the areas (explained in more detail below). The reflected light from the non-textured areas may produce a "high" signal output and reflected light from the textured areas may produce a "low" signal output. In addition to "high" and "low" signals, encoding information may comprise varying the width of the textured 74*a* and non-textured areas 74*b* such that the duration of the "high" and "low" signals detected may be varied. In embodiments in which the width of the areas may be varied, the varying widths may be integer multiples of a standard width. For example, the coded marker 70 of the ink stick of FIG. 4 includes "wide" textured areas that correspond to approximately twice the width of the "narrow" textured areas. Textured and non-textured areas may be provided that are two or more times wider than a standard "narrow" element.

Thus, a variety of encoding schemes may be implemented by providing coded markers 70 with various patterns of textured and non-textured areas of varying widths. For example, the coded marker 70 of the ink stick of FIG. 4 may be used to implement a binary encoding scheme. Because the textured 74*a* and non-textured areas 74*b* of the coded marker 70 are configured to generate "low" and "high" signal values respectively, a signal or waveform having two amplitude values may be generated. Using a binary encoding scheme, a code word encoded into a coded marker may comprise an n-bit binary code word with the high and low bit values corresponding to the high and low signal values. The widths of the textured and non-textured areas of the coded marker may be varied to provide additional opportunities for encoding bit information. For instance, "wide" textured areas may be configured to generate a signal indicating a "high" or "low" signal value with the "narrow" areas generating the opposite value. Additionally, the width of the textured and non-textured areas may be varied to indicate a bit sequence of the code word having bits of the same value, i.e. 111 or 000. Thus, two or more consecutive high bits (ones) may be indicated by providing a non-textured area of the coded marker that is an integer n wider than a non-textured area for indicating a single high value where n corresponds to the number of consecutive high bits.

With an n-bit binary code word, there are $2^n$ possible bit combinations, or code words, which may be generated. Thus, a code of twenty bits can generate over 1 million possible code words and thirty bits over 1 billion code words. Binary representations of data may be less complex to implement than other encoding schemes and may have a high signal-to-noise ratio because there are only two possible signal values to be detected. Any suitable encoding scheme, however, may be implemented. Standard barcode encoding and reading techniques may be implemented. Additionally, by treating areas of a coded marker to generate three or more possible signal values, base three and higher level encodings may be implemented.

Figure 5:
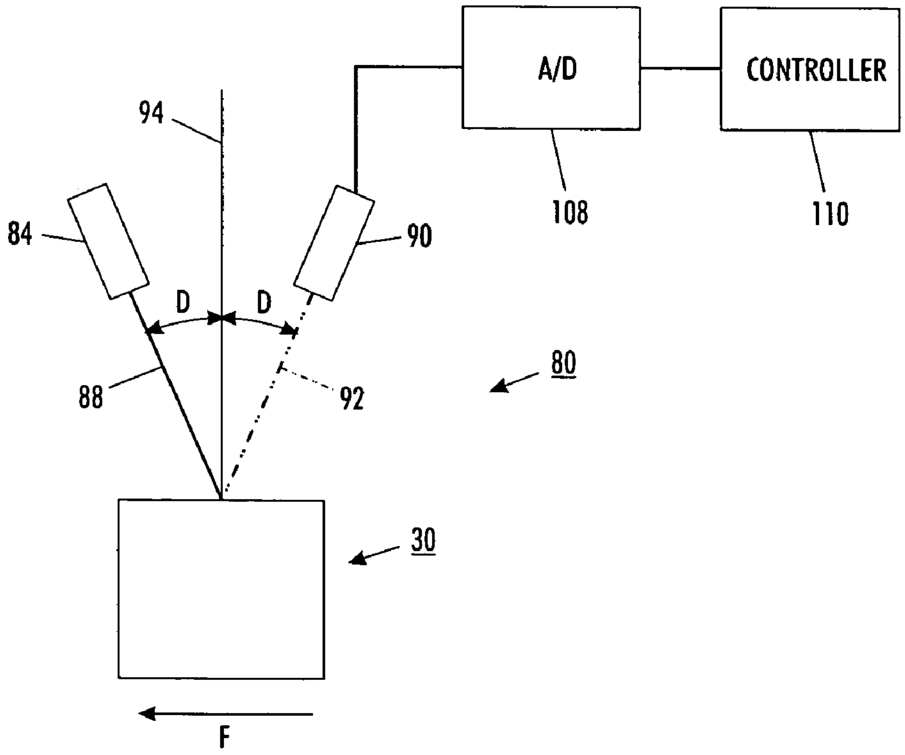
FIG. 5 is a schematic view of a sensor system for reading a coded marker of the ink stick of FIG. 4.

The number of bits that may be encoded into a coded marker 70 may depend on the size of the ink stick as well as the resolution of the sensor system for detecting the pattern of indicia 74 of the coded marker 70. Referring now to FIG. 5, a schematic of a code reader 80 for a feed channel of an ink loader is shown. The code reader 80 comprises an optical source 84 for directing a light beam 88 onto a coded marker as an ink stick 30 is transported along a feed channel in the feed direction F, and an optical sensor 90 for detecting a signal strength of the beam 92 that is reflected from the coded marker and generating a signal pattern, or waveform, that corresponds to the reflected signal strength.

In the embodiment of FIG. 5, the optical source 84 and the optical sensor 90 are fixedly mounted in a feed channel (not shown) of an ink loader in a position for the optical source to direct the light beam 88 onto a coded marker 70 of an ink stick. The optical source 84 and the optical sensor 90 are situated so that light emitted from the source 84 is directed at a coded marker of an ink stick 30 and is reflected by the patterned indicia of the coded marker onto the optical sensor 90 as the ink stick 30 is transported along the feed channel. In one embodiment, the optical source 84 and optical sensor 90 are placed such that the angle of illumination D relative to a center line 94 is approximately the same as the angle at which the sensor is placed relative to center line 94. The optical source 84 and the optical sensor 90 may be located at any point along the path of movement of the ink stick 30. Coded markers may be read during insertion or as the ink stick moves forward in the feed channel. Code reading in the channel may occur one or more times at one or more positions along the path of travel of the ink stick.

In the embodiment of FIG. 5, the optical source 84 comprises a line generator for projecting an optical line 104 (see FIG. 4) onto the coded marker 70 as the coded marker 70 passes the line generator 84 in the feed channel. The line 104 comprises a projection of light with a high aspect ratio (width over thickness). A line 104 having a high aspect ratio may prevent surface regularities inherent in the molding of the ink stick from interfering with the intended signal received at the optical sensor. In addition, the resolution and accuracy of the code reader 80 may depend on the focus or width of the line 104 relative to the widths of the encoded areas 74 of a coded marker 70. Thus, the width of the line 104 generated by the line generator 84 of the code reader of FIG. 5 is less than the width of the encoded areas 74 of the coded marker 70.

The optical sensor 90 may comprise a photodiode which converts detected light to electrical signals. The optical sensor 90 may include an amplifier (not shown) for amplifying the detected signal and an optical filter (not shown) tuned to the wavelength of light emitted by the line generator for eliminating stray light. While the optical sensor 90 described comprises a photodiode, other types of light sensors, such as photo-conductors, may be employed as the optical sensor 90 within the spirit and scope of the disclosure.

As the ink stick 30 proceeds along a feed channel in the feed direction F, the optical line 104 generated by line generator 84 scans over the textured 74*a* and non-textured areas 74*b* of the coded marker 70 causing the optical sensor 90 to vary in its electrical stimulation due to the scattering or absorbing effects of the areas. The optical sensor 90 outputs an analog signal that corresponds to the electrical stimulation caused by the coded marker 70 which may then be amplified and input to an analog-to-digital (A/D) converter 108 where the analog signal may be subjected to a threshold level for converting the output signal of the optical sensor 90 to a binary signal suitable for input to the controller 110.

The analog signal may be sampled at any suitable rate for conversion to the binary signal. For example, in one embodiment, the analog signal may be sampled at a rate that corresponds to the feed rate of the ink sticks along the feed channel to ensure that portions of the coded marker are not read more than once while an ink stick is not moving in the feed channel. Feed rate may be determined by calculating ink mass consumption using any suitable method such as, for instance, counting pulses of the print head or by determining position of the push block in the feed channel. As an alternative to sampling the analog signal at a sampling rate corresponding to the feed rate, the sensor system may be configured to read the coded markers in a manner independent of the feed rate. For example, the sensor system may be configured to scan over the coded marker by moving the optical source and sensor in relation to an ink stick.

In one embodiment, the bit pattern, or code word, of the binary signal may then be determined by the controller 110. The code word may be translated by the controller 110 into information that may be used in a number of ways by the control system of a printer. For example, the controller 110 may compare the reference signal to the data stored in the data structure, or table, stored in memory. The data stored in the data structure may comprise a plurality of possible code words with associated information corresponding to code word. The associated information may comprise control and/or attribute information that pertains to an ink stick such as, for example, ink stick color, printer compatibility, ink stick composition information, or may comprise printer calibration information pertaining to the ink stick, such as, for example, suitable color table, thermal settings, etc. that may be used with an ink stick. The control and/or attribute information may be used by a controller 110 in a suitably equipped phase change ink jet printer to control imaging operations. For example, the control system 110 may enable or disable operations, optimize operations or influence or set operation parameters based on the "associated information" that corresponds to the code word encoded in a coded marker.

Figure 6:
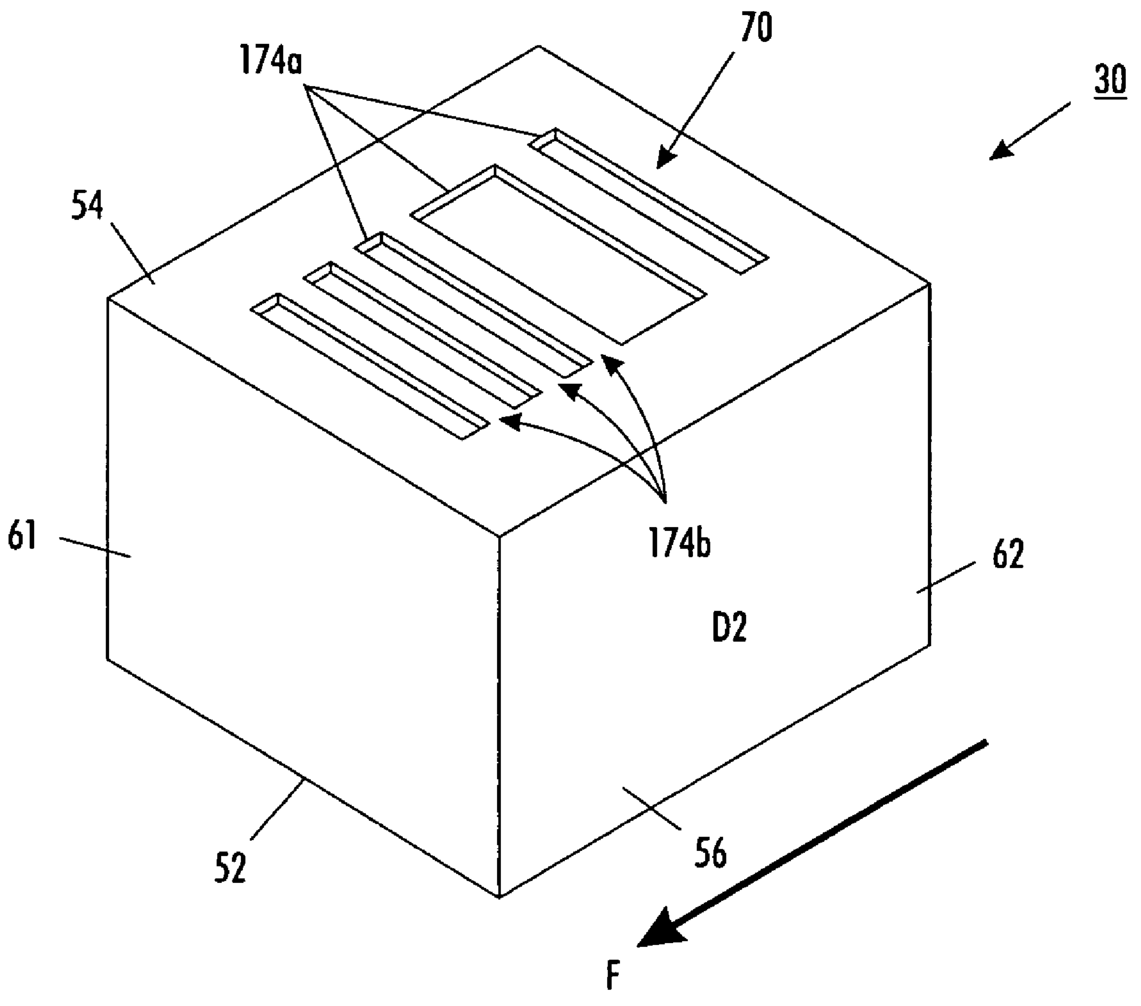
FIG. 6 is a perspective view of another embodiment of a solid ink stick with a coded marker.

Referring now to FIG. 6, there is shown another embodiment of a coded marker 70 for encoding information into an ink stick. In this embodiment, the coded marker 70 includes indicia 174 having variable heights/depths comprising recessed areas 174*a* and raised areas 174*b*. The coded signal pattern generated by this embodiment of a coded marker 70 corresponds to the signal strength of light reflected from the variable heights of the recessed 174*a* and raised areas 174*b*. The recessed 174*a* and/or raised areas 174*b* of the coded marker 70 may be formed by injection molding, stamping or any suitable method.

In a manner similar to that described above, the coded marker 70 may be read by serially illuminating the recessed 174*a* and raised areas 174*b* of the coded marker 70 and detecting the signal strength of the light reflected from the areas 174. In one embodiment, the reflected light from the raised areas 174*b* may produce a "high" signal output, and the reflected light from the recessed areas may produce a "low" signal output. Similar to above, encoding information may include varying the width of the recessed and raised areas such that the duration of the "high" and "low" signals detected may be varied. In embodiments in which the width of the areas may be varied, the varying widths may be integer multiples of a standard unit width.

Figure 7:
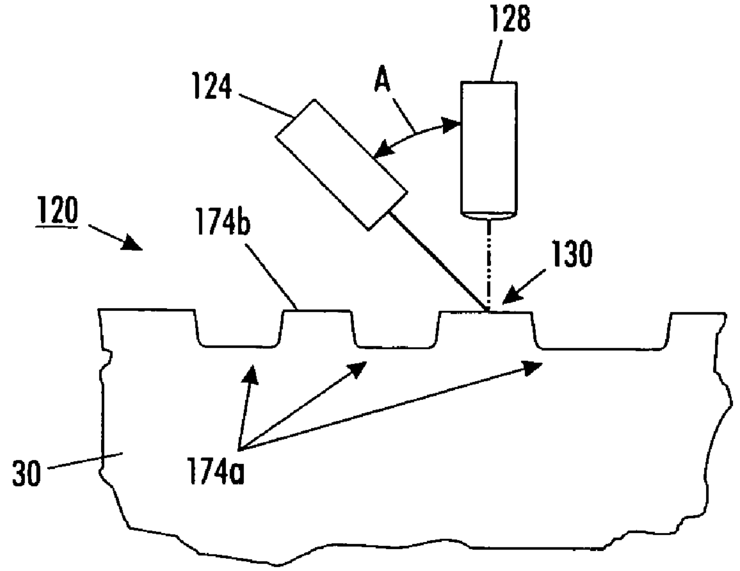
FIG. 7 is a schematic side view of a sensor system for reading a coded marker of the ink stick of FIG. 6.

FIG. 7 shows an embodiment of a code reader 120 for reading the coded marker 70 of FIG. 6. In this embodiment, the code reader 120 includes an optical source 124 and an optical sensor 128. The optical source 124 may comprise a light emitting diode (LED) or laser diode and a collimating lens which collimates the beam 130 emitted from the LED or laser diode toward a focus point in which the beam impinges on the coded marker of the ink stick. The optical sensor 128 may comprise a photodiode which converts detected light to electrical signals. The optical sensor 128 may include an amplifier (not shown) for amplifying the detected signal and an optical filter (not shown) tuned to the wavelength of light emitted by the optical source 124 for eliminating stray light. While the optical sensor 128 described comprises a photodiode, other types of light sensors, such as photo-conductors, may be employed.

Figure 8:
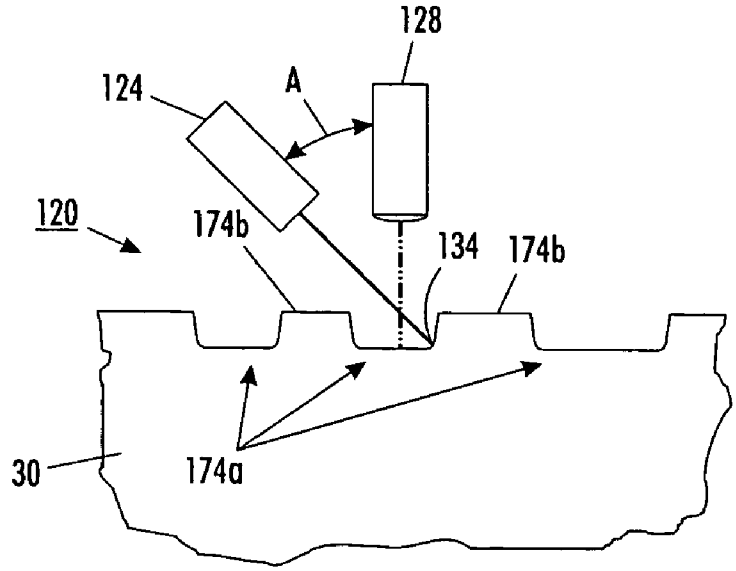
FIG. 8 is another schematic side view of a sensor system for reading a coded marker of the ink stick of FIG. 6.

Referring to FIG. 7, the optical source 124 is oriented at an angle A relative to the optical sensor 128 such that the source 124 is focused at a point 130 directly below the optical sensor 128 when sensing a raised area 174*b* of a coded marker 70. This provides for the optical sensor 128 to be stimulated by light being scattered by the surface of the raised areas of the coded marker. Referring to FIG. 8, as the ink stick is fed along the feed channel and a recessed area is moved under the sensor 128, the focus point 134 of source 124 is shifted such that it is no longer beneath the optical sensor 128 thereby decreasing the stimulation of the optical sensor by the light beam.

Figure 9:
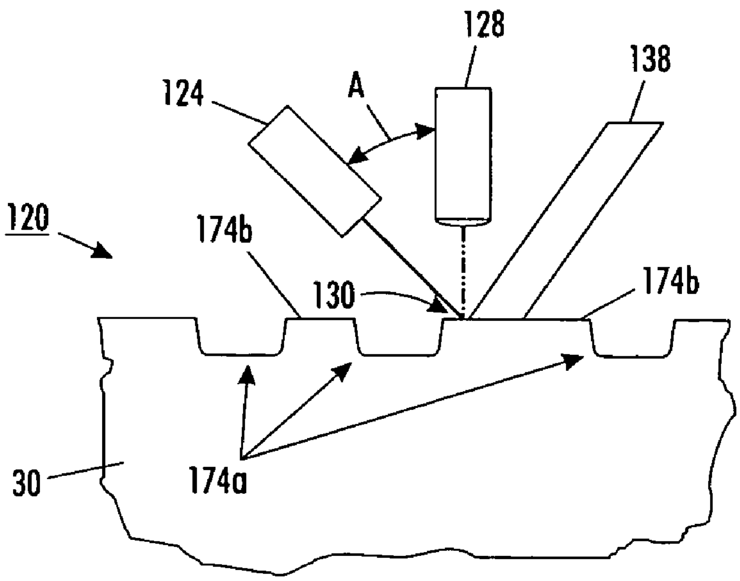
FIG. 9 is another schematic side view of a sensor system for reading a coded marker of the ink stick of FIG. 6.

In order to increase the signal-to-noise ratio of the coded signal pattern indicated by the coded marker, the code reader may include an opaque wall 138 for increasing the contrast between the signals generated by the raised and recessed areas of the coded marker as shown in FIG. 9. The wall 138 may be provided as part of a housing for enclosing the optical source 124 and sensor 128 or, alternatively, may be provided as a separate element. The opaque wall 138 may be composed of an opaque material such as an opaque plastic, or may be comprised of any suitable material having an opaque coating.

Figure 10:
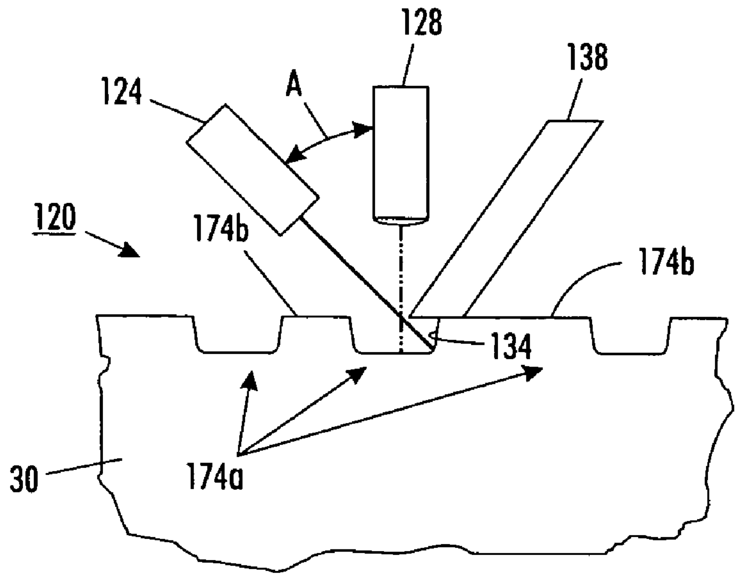
FIG. 10 is another schematic side view of a sensor system for reading a coded marker of the ink stick of FIG. 6.

The wall 138 is positioned such that the end of the wall is adjacent the focus point 130 of the light beam when the optical sensor 128 is positioned above a raised area 174*b* of the coded marker 70. Thus, referring to FIG. 9, the optical source is focused at a point directly below the optical sensor 128 and directly ahead of wall 138. Referring now to FIG. 10, as the ink stick 30 is fed along the feed channel and a recessed area 174*a* is moved into an area below the optical sensor 128, the focus point 134 of source is shifted such that it falls beneath wall 138 causing it to be shaded from sensor 128. The sensor 128 is therefore no longer stimulated providing for an indication of the recessed area 174*a*.

Figure 11:
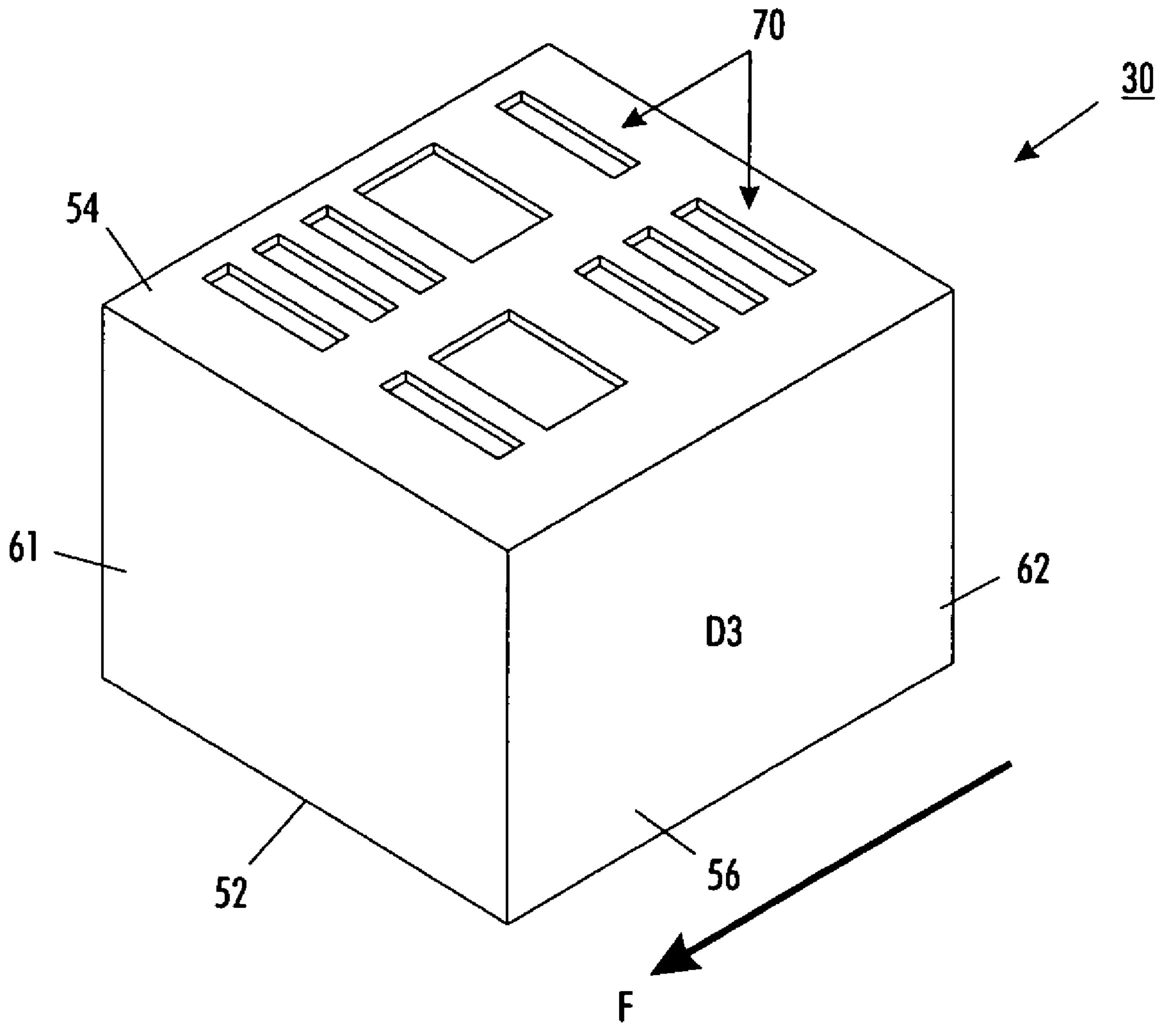
FIG. 11 is a perspective view of an embodiment of a solid ink stick with two coded markers.

As mentioned above, the number and positioning of coded markers that may be formed into an ink stick is limited only by the geometry of the ink sticks and sensor placement options in an ink loader. Referring to FIG. 11, there is shown an embodiment of an ink stick having two coded markers 70 formed on the top surface 54 of an ink stick. In this embodiment, each coded marker 70 may be configured to indicate a separate code word to a control system, or the coded markers may be configured to indicate a single "long" code word.

Figure 12:
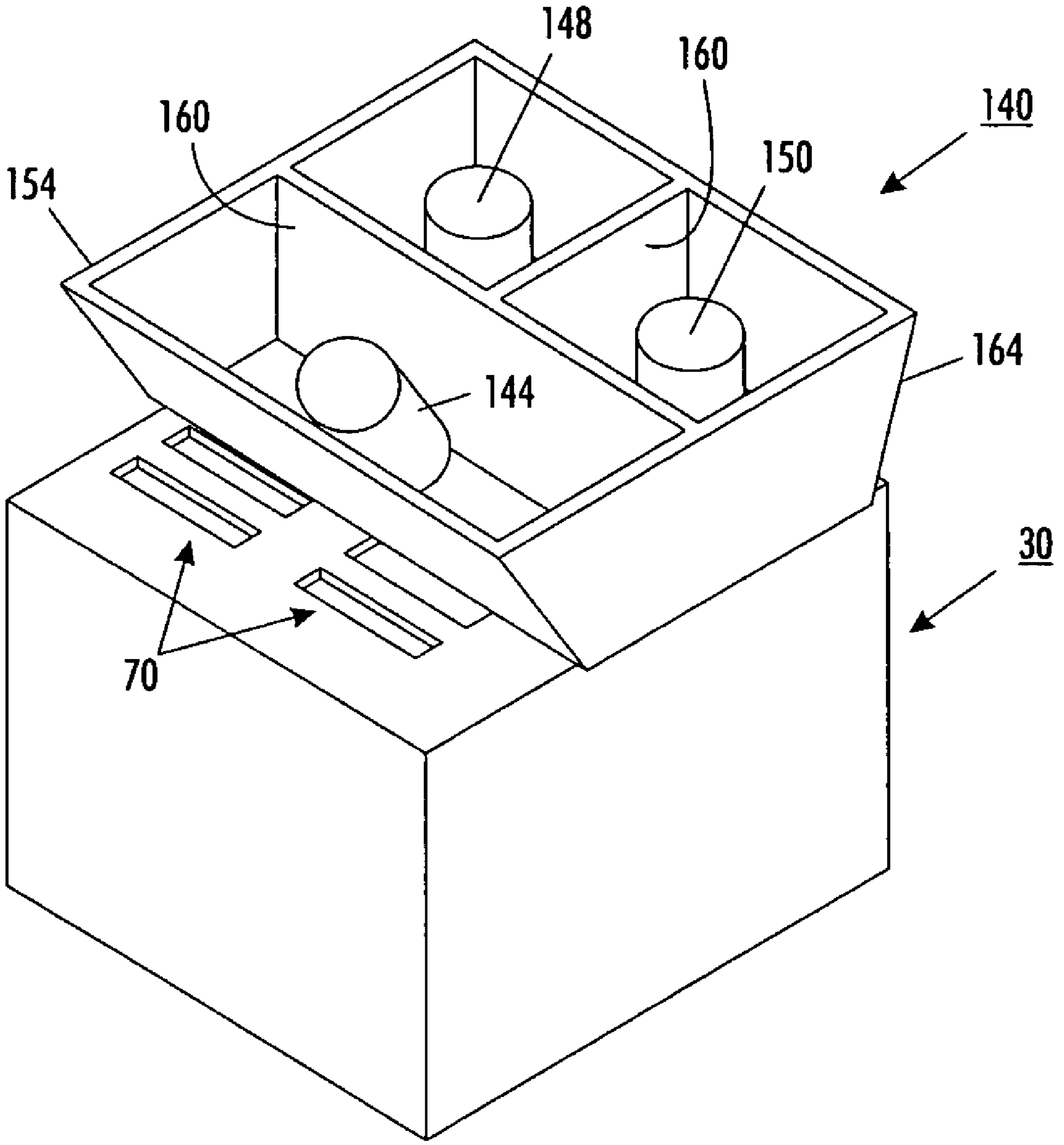
FIG. 12 is a schematic side view of a sensor system for reading the coded markers of the ink stick of FIG. 11.

FIG. 12 shows an embodiment of a code reader for reading multiple tracks. In this embodiment, the code reader 140 includes a single optical source 144 for illuminating each coded marker 70 of the ink stick and a pair of optical sensors 148, 150, one for detecting the signal strength of the light scattered by the coded patterns of indicia of the coded markers 70. The optical source 144 and pair of optical sensors 148, 150 are provided in a housing 154 with sections divided by opaque walls 160 for preventing stray light from one coded marker being detected by an optical sensor of the other coded marker. In addition, the housing may include a contrast wall 164 for increasing the contrast of the sensed light between the encoded areas of a coded marker in a manner similar to the wall 138 of FIGS. 9 and 10.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An ink stick for use in an ink loader of a phase change ink imaging device, the ink stick comprising:

an ink stick body configured to produce a single color of ink and to fit within a feed channel of a phase change ink imaging device, the ink stick body having an exterior surface that exhibits the single color of ink to be produced by melting the ink stick body; and at least one coded marker having textured areas of varying reflective properties in the exterior of the ink stick body that are configured to reflect light at a first signal level and non-textured areas in the exterior of the ink stick body that are configured to reflect light at a second signal level, the textured areas and non-textured areas of the at least one coded marker being serially arranged in the exterior surface of the ink stick body, the at least one coded marker being configured to generate a coded pattern of a plurality of indicia that comprise a code word that is serially configured to indicate variable control/attribute information to a control system of a phase change ink imaging device before the ink stick body is melted in the phase change imaging device to produce the single color of ink.

2. The ink stick of claim 1, the textured and non-textured areas having varying widths, each textured area including at least one indicia.

3. The ink stick of claim 1, the code word comprises a binary code word; and the coded pattern of the plurality of indicia is configured to indicate a bit pattern of the binary code word.

4. The ink stick of claim 1, the coded pattern of the plurality of indicia further comprising:

a linear array of indicia horizontally oriented on the exterior surface of the ink stick body.

5. The ink stick of claim 1, the coded pattern of the plurality of indicia further comprising:

a linear array of indicia vertically oriented on the exterior surface of the ink stick body.

6. The ink stick of claim 1, the plurality of indicia further comprising:

a plurality of alphanumeric characters.

7. An ink stick for use in an ink loader of a phase change ink imaging device, the ink stick comprising:

an ink stick body configured to produce a single color of ink and to fit within a feed channel of a phase change ink imaging device, the ink stick body having an exterior surface that exhibits the single color of ink to be produced by melting the ink stick body; and at least one coded marker having recessed areas in the exterior of the ink stick body that are configured to reflect light at a first signal level and raised areas in the exterior of the ink stick body that are configured to reflect light at a second signal level, the recessed areas and raised areas of the at least one coded marker being serially arranged in the exterior surface of the ink stick body, the at least one coded marker being configured to generate a coded pattern of a plurality of indicia that comprise a code word that is serially configured to indicate variable control/attribute information to a control system of a phase change ink imaging device before the ink stick body is melted in the phase change imaging device to produce the single color of ink.

8. The ink stick of claim 7, the textured and non-textured areas having varying widths, each textured area including at least one indicia.

9. The ink stick of claim 7, the code word comprises a binary code word; and the coded pattern of the plurality of indicia is configured to indicate a bit pattern of the binary code word.

10. The ink stick of claim 7, the coded pattern of the plurality of indicia further comprising:

a linear array of the plurality of indicia horizontally oriented on the exterior surface of the ink stick body.

11. The ink stick of claim 7, the coded pattern of the plurality of indicia further comprising:

a linear array of indicia vertically oriented on the exterior surface of the ink stick body.

12. The ink stick of claim 7, the plurality of indicia further comprising:

a plurality of alphanumeric characters.

* * * * *